United States Patent
Lin

(10) Patent No.: US 7,659,886 B2
(45) Date of Patent: Feb. 9, 2010

(54) ELECTRICAL APPARATUS WITH ILLUMINATION DEVICE

(75) Inventor: Yung Kun Lin, Taipei (TW)

(73) Assignee: ASUSteK Computer Inc., Taipei (TW)

( * ) Notice: Subject to any disclaimer, the term of this patent is extended or adjusted under 35 U.S.C. 154(b) by 831 days.

(21) Appl. No.: 11/105,522

(22) Filed: Apr. 14, 2005

(65) Prior Publication Data

US 2005/0248536 A1 Nov. 10, 2005

(30) Foreign Application Priority Data

May 5, 2004 (TW) .............................. 93112696 A

(51) Int. Cl.
G09G 5/00 (2006.01)
G06F 3/02 (2006.01)
(52) U.S. Cl. ...................... 345/168; 345/156
(58) Field of Classification Search ......... 345/156–184; 340/407.1–407.2; 708/142–146
See application file for complete search history.

(56) References Cited

U.S. PATENT DOCUMENTS

| 6,217,183 | B1* | 4/2001 | Shipman ....................... 362/30 |
| 6,284,988 | B1* | 9/2001 | Watanabe et al. ........... 200/5 A |
| 6,609,805 | B1* | 8/2003 | Nelson ......................... 362/30 |
| 6,918,677 | B2* | 7/2005 | Shipman ....................... 362/26 |
| 6,929,391 | B2* | 8/2005 | Hotelling .................... 362/612 |
| 7,086,768 | B2* | 8/2006 | Suwa et al. ................. 362/555 |

* cited by examiner

*Primary Examiner*—Srilakshmi K Kumar
(74) *Attorney, Agent, or Firm*—Birch, Stewart, Kolasch & Birch, LLP

(57) ABSTRACT

An electrical apparatus comprises a casing, a light-guiding device and a light-emitting device. In this case, the casing has a keyboard setting area for accommodating a keyboard. An opening is located at one side of the keyboard setting area. The light-guiding device is set in the casing and is near to the opening. Light is emerged from the light-guiding device and a part of the light passes through the opening to one side of the keyboard. The light-emitting device is set at one side of the light-guiding device.

11 Claims, 5 Drawing Sheets

ELECTRICAL APPARATUS WITH ILLUMINATION DEVICE

BACKGROUND OF THE INVENTION

1. Field of Invention

The invention relates to an electrical apparatus and, in particular, to an electrical apparatus, which has illumination device in dark environment.

2. Related Art

As the coming of the electronic age, the dependences and demands of people on the electrical products have greatly grown. Since the market trends mostly depend on the customers, the preferred products should not only have competitive prices, but also be equipped with conveniences in characteristics and usages. Therefore, the manufacturers usually work hard to create the products filling the customer's needs.

Taking a computer as an example, when the operation environment has insufficient light or is dark, a user usually cannot distinguish all buttons clearly, which results in the inconvenience of the operation. In view of this, a conventional solution is to install an internal light source in the keyboard 1, as shown in FIG. 1. The keyboard 1 includes a plurality of buttons 11, each of which is composed of a button cap 111, a transparent top plate 112 and a rubber pad 113. A light-guiding plate 12, which has the same area as the keyboard 1, is disposed under the buttons 11. A plurality of light sources 13 are installed at the periphery of the light-guiding plate 12, and are used as a backlight. The light sources 13 are driven with electric power through the wire 14. With the light emitted from the backlight, the buttons 11 can be illuminated in the dark environment. However, the above-mentioned method employs the light-guiding plate with a large area and several light sources, which increase the manufacturing cost.

Alternatively, one of ordinary skill in the art may use an extra lamp with an USB connecter for illuminating the keyboard. However, this solution is more complex in usage, and does not match the trend of convenience.

In addition, the present keyboard is used only for inputting instructions and is not designed for user's vision. For example, changing the color and luminance of the light of the keyboard may satisfy the user's vision.

It is therefore a subjective of the invention to provide an electrical apparatus, which can solve the above-mentioned problem of clearly distinguishing buttons in dark environment.

SUMMARY OF THE INVENTION

In view of the foregoing, the invention is to provide an electrical apparatus, which has recognizable buttons in dark environment.

To achieve the above, an electrical apparatus of the invention includes a casing, a light-guiding device and a light-emitting device. In the invention, the casing has a keyboard setting area for accommodating a keyboard. An opening is located at one side of the keyboard setting area. The light-guiding device is set in the casing and is near to the opening. A part of light emerged from the light-guiding device passes through the opening to one side of the keyboard. The light-emitting device is set at one side of the light-guiding device.

In addition, a surface of the light-guiding device is applied with a plurality of dyes with different colors, such that the light emerged from the light-guiding device comprises a plurality of colors.

Moreover, a surface of the light-guiding device is formed with a texture for lowering the luminance of the light. Thus, the light emerged from the light-guiding device may have variant luminance.

Furthermore, at least one annular protrusion is disposed on a surface of the light-guiding device. When the annular protrusion is rotated, the light-guiding device is rotated. Accordingly, the light emerged from the light-guiding device may include several colors or have variant luminance.

As mentioned previously, the electrical apparatus of the invention has recognizable buttons in dark environment. Comparing to the prior art, the invention can achieve this without the light-guiding plate with the large area and the several light sources. Thus, the manufacturing cost can be decreased, and the total weight of the product can be reduced. In addition, the luminance and color of the light illuminating the buttons can be changed so as to match the demands of users and to increase the characteristic of the product.

BRIEF DESCRIPTION OF THE DRAWINGS

The invention will become more fully understood from the detailed description given herein below illustration only, and thus is not limitative of the present invention, and wherein.

DETAILED DESCRIPTION OF THE INVENTION

The present invention will be apparent from the following detailed description, which proceeds with reference to the accompanying drawings, wherein the same references relate to the same elements.)

Figure 1:
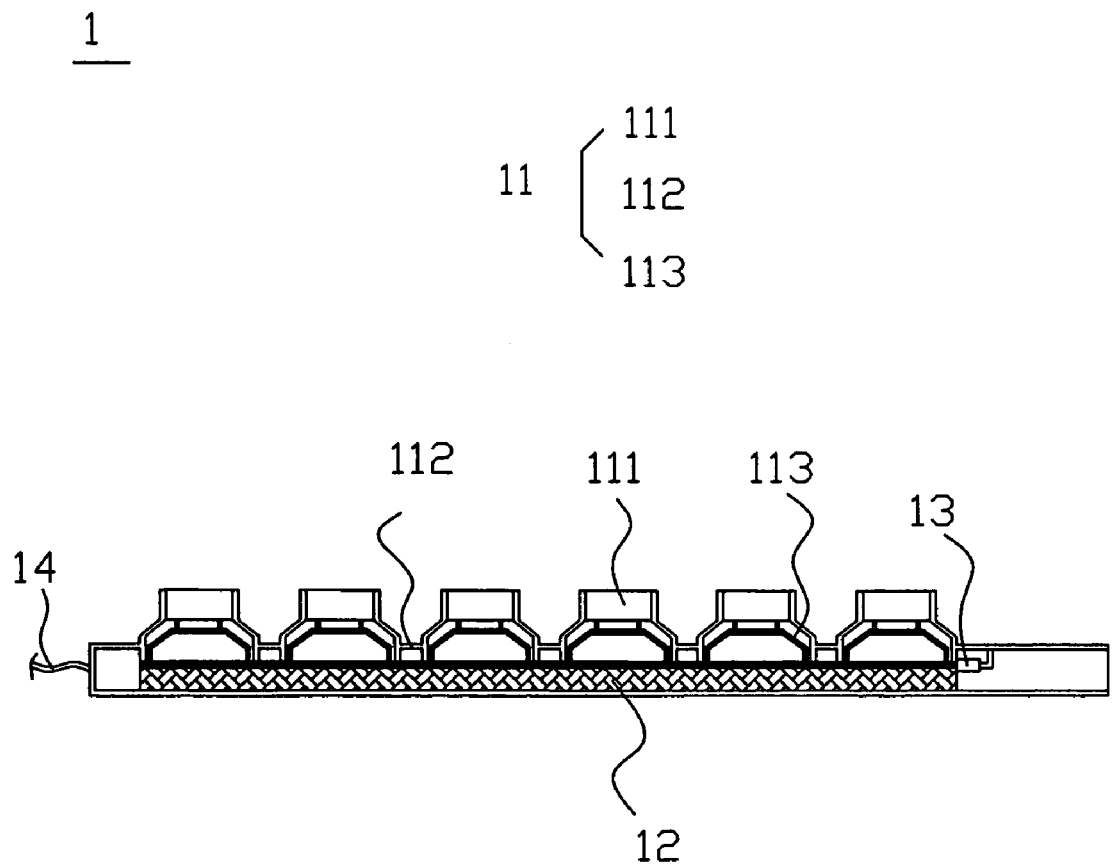
FIG. 1 is a schematic view showing the conventional keyboard.
Figure 2:
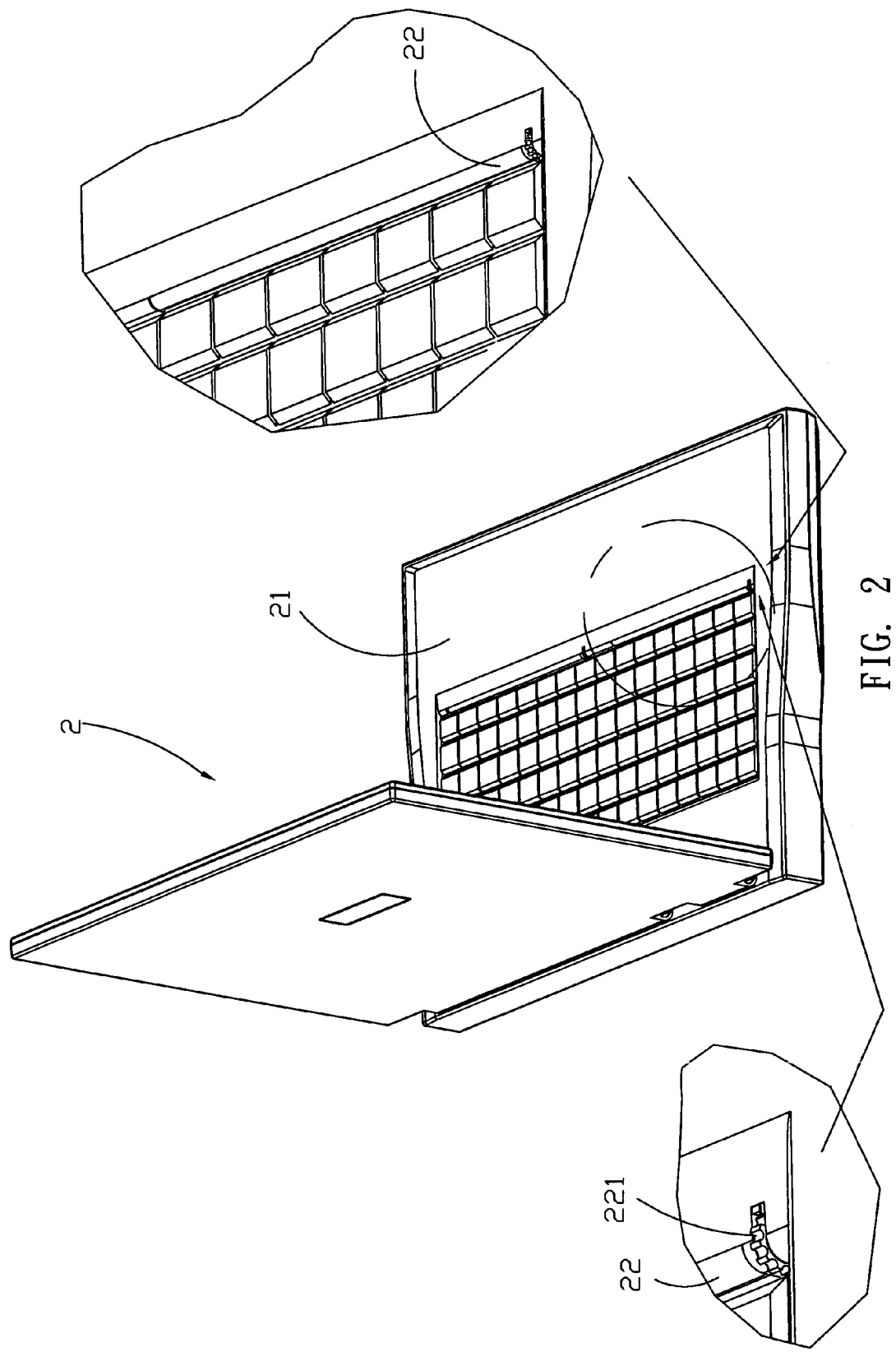
FIG. 2 is a schematic view and a partial enlarged view showing an electrical apparatus according to a preferred embodiment of the invention.
Figure 4:
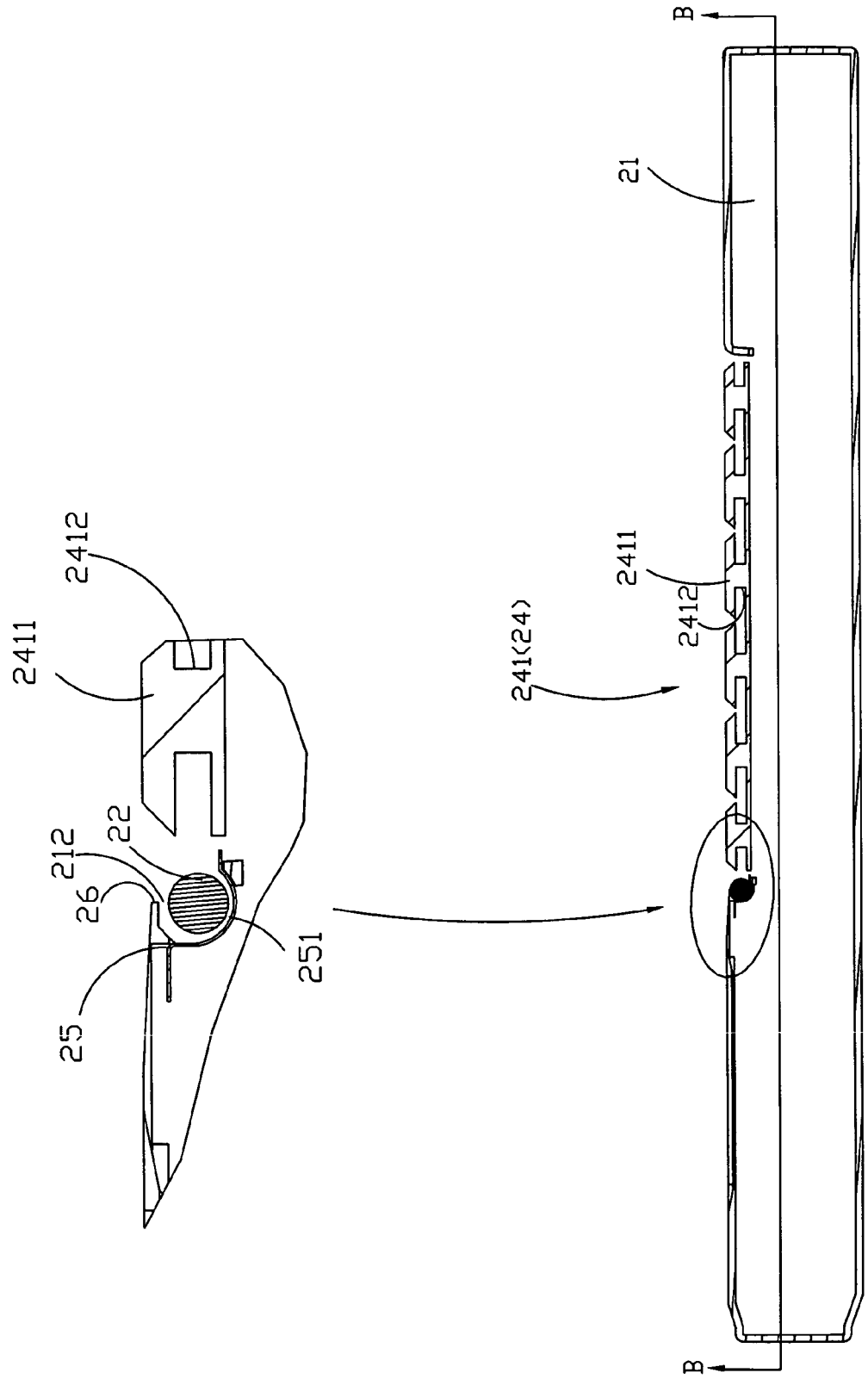
FIG. 4 is a schematic view showing a partial enlarged view and a sectional view along the line A-A shown in FIG. 3.
Figure 5:
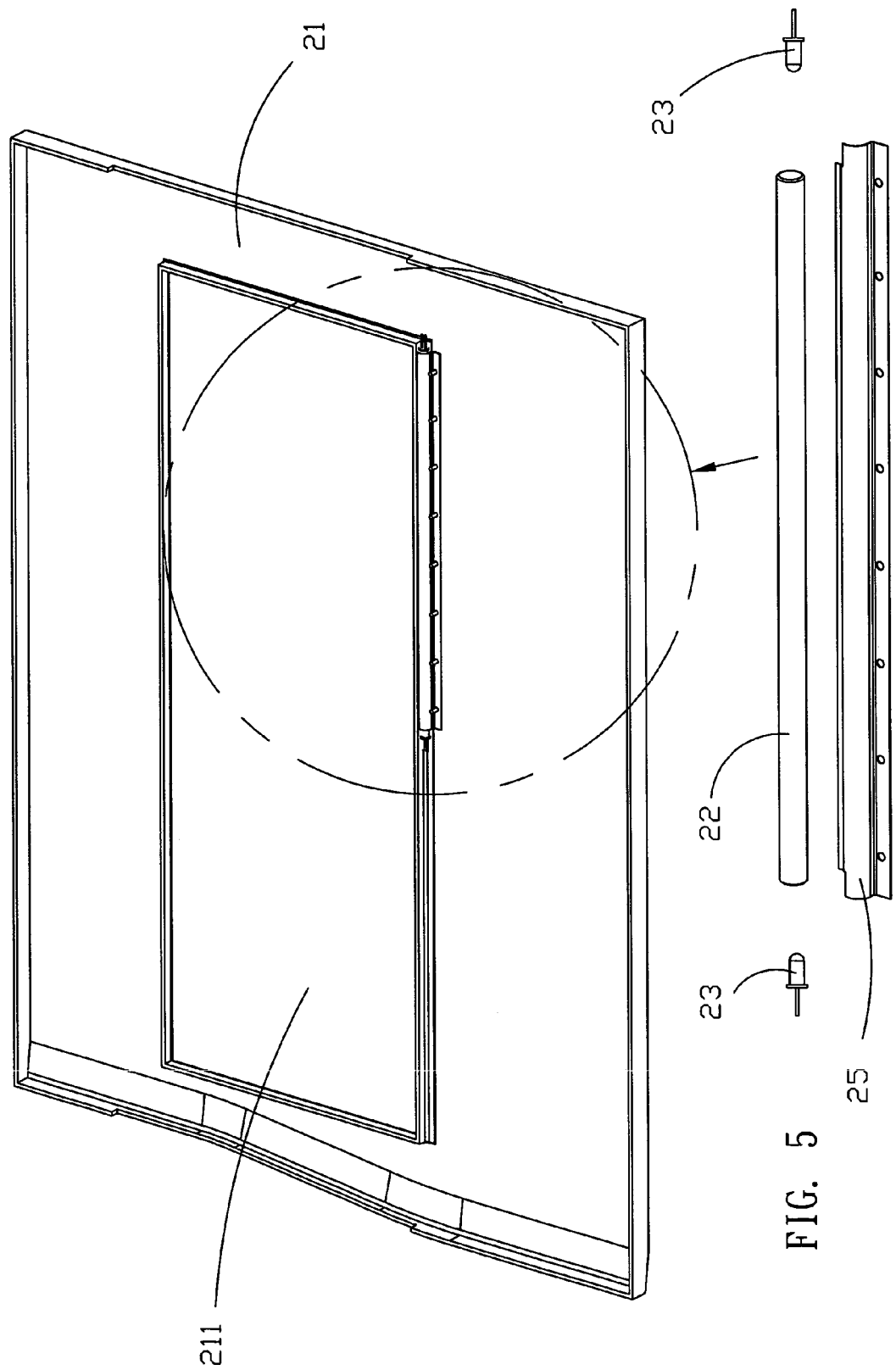
FIG. 5 is a schematic view showing a partial enlarged view and a sectional view along the line B-B shown in FIG. 4.

With reference to FIGS. 2, 4 and 5, an electrical apparatus 2 according to a first embodiment of the invention includes a casing 21, a light-guiding device 22 and a light-emitting device 23. The casing 21 has a keyboard setting area 211 for accommodating a keyboard 24 and an opening 212 located at one side of the keyboard setting area 211. The light-guiding device 22 is set in the casing 21 and is near to the opening 212. A part of light emerged from the light-guiding device 22 passes through the opening 212 to one side of the keyboard 24. The light-emitting device 23 is set at one side of the light-guiding device 22.

Figure 3:
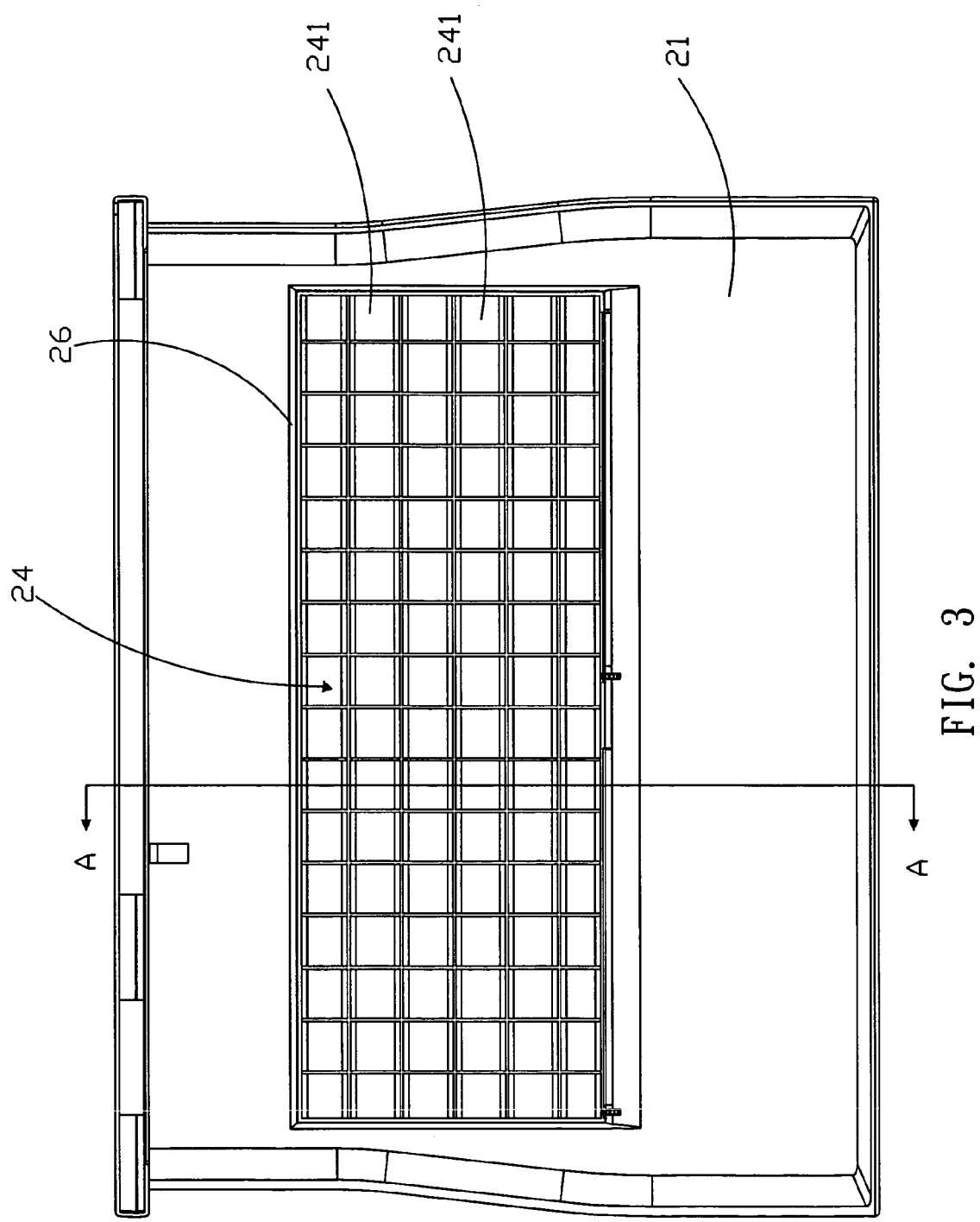
FIG. 3 is a schematic view showing a mainframe of the electrical apparatus according to the embodiment of the invention.

With reference to FIGS. 3 and 5, the keyboard setting are 211 is positioned at the center of the casing 21, and the keyboard 24 is accommodated in the keyboard setting area 211. In this embodiment, the position of the keyboard setting area 211 can be adjusted according to any demand. The keyboard setting area 211 is a concave having a plurality of side walls 26, and the opening 212 is disposed on at least one of the side walls 26.

As shown in FIGS. 4 and 5, the keyboard 24 includes at least one button 241, which has a keycap 2411 and a springy control member 2412. The keycap 2411 connects to the springy control member 2412, and the keycap 2411 is located over the springy control member 2412. When a user presses the keycap 2411, the springy control member 2412 is moved correspondingly. Once the button 241 is pressed, an encoder of a circuit board set below the button 241 processes an encoding procedure to output a specific control signal to the mainframe.

Please refer to FIGS. 4 and 5 again. The light-guiding device 22 is disposed in the casing 21 and is adjacent to the opening 212. The opening 212 is located at (at least) one side of the keyboard setting area 211. In practice, the location of the opening 212 is related to the position of the light-guiding device 22. For example, the opening 212 can be disposed at remaining three sides of the keyboard setting area 211, and the light-guiding device 22 is correspondingly installed at three sides of the keyboard setting area 211.

In the embodiment, a part of light emerged from the light-guiding device 22 passes through the opening 212 to at least one side of the keyboard 24, such as several rows of the buttons 241 close to the opening 212. In addition, the light emerged from the light-guiding device 22 passes through the underneath of the keycap 2411 and reaches the keycap 2411 to illuminate at least one part of the keycap 2411. For instance, the light may pass through several rows of buttons 241 close to the opening 212 and illuminate the next several rows of button 241.

In the present embodiment, the light-guiding device 22 is a light-guiding rod and serves as a transmission medium of the light emitted from the light-emitting device 23. To be noted, the shape and material of the light-guiding device 22 may affect the luminance and uniformity of the light emitted from the light-emitting device 23.

As shown in FIG. 5, the light-emitting device 23 is disposed adjacent to at least one side of the light-guiding device 22. In the current embodiment, the light-emitting device 23 may emit dot light, and is installed at two sides of the light-guiding device 22.

In this embodiment, the light is emitted from the light-emitting device 23 to the light-guiding device 22 so as to illuminate at least one side of the button 241. To be noted, the dimensions and configurations of the light-guiding device 22 and the light-emitting device 23 can be properly adjusted according to the actual demands.

The light-emitting device 23 of the embodiment may be selected from one of the fluorescent lamp (including the cold cathode fluorescent lamp (CCFL) and the hot cathode fluorescent lamp), light-emitting diode (LED), incandescent lamp, halogen lamp, electroluminscence (EL) lamp and the likes. In addition, the light-emitting device 23 can also be the backlight module of the screen consisting of the fluorescent lamp, incandescent lamp, halogen lamp, or electroluminscence (EL) lamp.

With reference to FIGS. 4 and 5, the electrical apparatus 2 may further include a reflective device 25. The reflective device 25 has at least one part fixed on the casing 21. The light-guiding device 22 is positioned between the reflective device 25 and the casing 21, and the reflective device 25 covers at least one pair of the light-guiding device 22. The reflective device 25 has a reflecting surface 251 for reflecting the light emerged from the light-guiding device 22 so as to guide the light to the opening 212. In this case, the reflective device 25 can be fixed on the casing 21 by way of heatstake or screwing. For example, the reflective device 25 is a metal plate to be attached to the casing 21. Otherwise, the reflective device 25 can comprise a plastic material capable of converging light that is formed by way of electroplating or sputtering.

The surface of the light-guiding device 22 can be applied with a plurality of dyes with different colors, such that the light emerged from the light-guiding device 22 may comprise a plurality of colors. This design allows the color of the light illuminating the buttons 241 to be changed according to the user's demands or the environment factors.

In addition, the surface of the light-guiding device 22 may be formed with at least one texture for lowering the luminance of the light. One of ordinary skill in the art should know that the texture pattern causes the decreased luminance of different levels. This design allows the luminance of the light illuminating the buttons 241 to be changed according to the user's demands or the environment factors. For example, when the environment is very dark, the higher luminance of the light illuminating the buttons 241 may be harsh to the eyes to cause inconvertible of users. In such a case, the proper texture pattern can be employed to lower the luminance of the light.

As shown in FIG. 2, at least one annular protrusion 221 is disposed on one end of the light-guiding device 22. When the annular protrusion 221 is rotated, the light-guiding device 22 is rotated accordingly such that the light emerged from the light-guiding device 22 may include several colors or may have variant luminance. Herein, the annular protrusion 221 can be formed on the light-guiding device 22 directly, or be attached to the surface of the light-guiding device 22 additionally.

In summary, the electrical apparatus of the invention has recognizable buttons in dark environment. Comparing to the prior art, the invention can achieve this without the light-guiding plate with the large area and the several light sources. Thus, the manufacturing cost can be decreased, and the total weight of the product can be reduced. In addition, the luminance and color of the light illuminating the buttons can be changed so as to match the demands of users and to increase the characteristic of the product.

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. An electrical apparatus, comprising:
   a casing having a keyboard setting area for accommodating a keyboard and an opening located adjacent to at least one side of the keyboard setting area;
   a light-guiding device set in the casing and near the opening, wherein a part of light emerged from the light-guiding device passes through the opening to at least one side of the keyboard; and
   a light-emitting device disposed adjacent to at least one side of the light-guiding device,
   wherein a surface of the light-guiding device is applied with a plurality of dyes with different colors, such that the light emerged from the light-guiding device comprises a plurality of colors, and
   wherein at least one annular protrusion is disposed on the surface of the light-guiding device, and a rotation of the annular protrusion causes a rotation of the light-guiding device such that the light emerged from the light-guiding device comprises the colors.

2. The electrical apparatus of claim 1, wherein the keyboard comprises at least one button, the button has a keycap, and the light passes through the button and reaches the keycap to illuminate at least one part of the keycap.

3. The electrical apparatus of claim 1, wherein the light is emitted from the light-emitting device to the light-guiding device and then illuminates at least one side of the button.

4. The electrical apparatus of claim 1, wherein the keyboard setting area is a concave having a plurality of side walls, and the opening is disposed on at least one of the side walls.

5. The electrical apparatus of claim 1, further comprising:
a reflective device having at least one part fixed on the casing, wherein the light-guiding device is positioned between the reflective device and the casing, and the reflective device covers at least one part of the light-guiding device.

6. The electrical apparatus of claim 5, wherein the reflective device has a reflecting surface for reflecting the light emerged from the light-guiding device so as to guide the light to the opening.

7. The electrical apparatus of claim 5, wherein the reflective device is fixed on the casing by way of one selected form heatstake and screwing.

8. The electrical apparatus of claim 1, wherein the light-guiding device is light-guiding rod.

9. The electrical apparatus of claim 1, wherein the light-emitting device is light-emitting diode.

10. The electrical apparatus of claim 1, wherein at least one annular protrusion is disposed on the surface of the light-guiding device, and a rotation of the annular protrusion causes a rotation of the light-guiding device such that the light emerged from the light-guiding device comprises variant luminance.

11. The electrical apparatus of claim 1, wherein a surface of the light-guiding device is formed with a texture for lowering the luminance of the light.

* * * * *

UNITED STATES PATENT AND TRADEMARK OFFICE
CERTIFICATE OF CORRECTION

| | |
|---|---|
| PATENT NO. | : 7,659,886 B2 |
| APPLICATION NO. | : 11/105522 |
| DATED | : February 9, 2010 |
| INVENTOR(S) | : Yung Kun Lin |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1336 days.

Signed and Sealed this

Twenty-eighth Day of December, 2010

David J. Kappos
*Director of the United States Patent and Trademark Office*